(12) United States Patent
Finkel et al.

(10) Patent No.: US 10,931,107 B2
(45) Date of Patent: Feb. 23, 2021

(54) SYSTEM AND METHOD FOR MANAGEMENT OF AN ELECTRICITY DISTRIBUTION GRID

(71) Applicant: FORESIGHT ENERGY LTD., Hod HaSharon (IL)

(72) Inventors: Evgeny Finkel, Petah-Tikva (IL); Emek Sadot, Ram-On (IL); Sergei Edelstein, Herzliya (IL); Nir Badt, Herzliya (IL)

(73) Assignee: FORESIGHT ENERGY LTD., Hod HaSharon (IL)

( * ) Notice: Subject to any disclaimer, the term of this patent is extended or adjusted under 35 U.S.C. 154(b) by 0 days.

(21) Appl. No.: 16/339,392

(22) PCT Filed: Oct. 2, 2017

(86) PCT No.: PCT/IL2017/051114
§ 371 (c)(1),
(2) Date: Apr. 4, 2019

(87) PCT Pub. No.: WO2018/065980
PCT Pub. Date: Apr. 12, 2018

(65) Prior Publication Data
US 2020/0044446 A1 Feb. 6, 2020

Related U.S. Application Data

(60) Provisional application No. 62/404,789, filed on Oct. 6, 2016.

(51) Int. Cl.
*H02J 3/06* (2006.01)
*G05B 13/04* (2006.01)
(Continued)

(52) U.S. Cl.
CPC .............. *H02J 3/06* (2013.01); *G05B 13/048* (2013.01); *G05B 15/02* (2013.01); *G06Q 50/06* (2013.01);
(Continued)

(58) Field of Classification Search
CPC ...... H02J 3/008; H02J 3/06; H02J 3/14; H02J 3/381; H02J 3/46; H02J 13/00002;
(Continued)

(56) References Cited

U.S. PATENT DOCUMENTS 9,053,438 B2 * 6/2015 Marwah ................. G06Q 50/06
9,207,735 B2 * 12/2015 Khaitan .................... H02J 3/32
(Continued)

FOREIGN PATENT DOCUMENTS

| WO | WO 2012/008979 | 1/2012 |
| WO | WO 2014/057133 | 4/2014 |
| WO | WO 2016/077813 | 5/2016 |

OTHER PUBLICATIONS

European Search Report of Application No. EP17857971.0 dated Mar. 3, 2020.
(Continued)

*Primary Examiner* — Crystal J Barnes-Bullock
(74) *Attorney, Agent, or Firm* — Pearl Cohen Zedek Latzer Baratz LLP

(57) ABSTRACT

Systems and methods of managing an electricity distribution grid, including receiving a layout of at least one electricity distribution grid coupled to at least one power distributor facility, each grid having at least two electrical power nodes, collecting data for at least one consumer of the electricity distribution grid, assigning a dynamic consumer value to each of the at least one consumer according to predefined attributes, determining aggregated power consumption values for each electrical power node, wherein for each elec-
(Continued)

trical power node the aggregated power consumption values are received for all consumers assigned thereto, and allocating resources of the at least one power distributor facility, from the first electrical power node to the second electrical power node, if the difference between the compared consumer values exceeds a predetermined threshold.

19 Claims, 6 Drawing Sheets

(51) Int. Cl.
    *H02J 3/38*     (2006.01)
    *H02J 13/00*     (2006.01)
    *H02J 3/00*     (2006.01)
    *H02J 3/46*     (2006.01)
    *H02J 3/14*     (2006.01)
    *G05B 15/02*     (2006.01)
    *G06Q 50/06*     (2012.01)

(52) U.S. Cl.
    CPC ............... *H02J 3/008* (2013.01); *H02J 3/14* (2013.01); *H02J 3/381* (2013.01); *H02J 3/46* (2013.01); *H02J 13/00002* (2020.01); *H02J 2203/20* (2020.01); *H02J 2300/22* (2020.01); *H02J 2310/14* (2020.01); *Y02B 70/30* (2013.01); *Y02E 10/56* (2013.01); *Y02E 40/70* (2013.01); *Y02E 60/00* (2013.01); *Y02P 80/10* (2015.11); *Y04S 10/12* (2013.01); *Y04S 10/123* (2013.01); *Y04S 10/14* (2013.01); *Y04S 20/221* (2013.01); *Y04S 50/10* (2013.01)

(58) Field of Classification Search
    CPC ............... H02J 13/0017; H02J 2203/20; H02J 2300/22; H02J 2310/14; G06Q 10/04; G06Q 50/06; G05B 13/048; G05B 15/02; Y04S 10/12; Y04S 10/123; Y04S 10/14; Y04S 20/221; Y04S 50/10; Y02E 10/563; Y02E 40/72; Y02E 60/721; Y02E 60/722; Y02P 80/11; Y02B 70/3216

See application file for complete search history.

(56) References Cited

U.S. PATENT DOCUMENTS

| | | | |
|---|---|---|---|
| 9,601,924 B2* | 3/2017 | Nishi | H02J 13/0062 |
| 9,641,026 B2* | 5/2017 | Boardman | H02J 13/0079 |
| 9,742,197 B2* | 8/2017 | Barr | H02J 3/46 |
| 10,063,052 B2* | 8/2018 | Weckx | H02J 3/06 |
| 10,566,792 B2* | 2/2020 | Ellice-Flint | H02J 3/381 |
| 2011/0054709 A1 | 3/2011 | Son | |
| 2011/1005470 | 3/2011 | Son | |
| 2011/0288905 A1* | 11/2011 | Mrakas | G06Q 10/06 |
| | | | 705/7.25 |
| 2013/0015703 A1 | 1/2013 | Kelly et al. | |
| 2013/0024141 A1 | 1/2013 | Cullen et al. | |
| 2014/0025218 A1 | 1/2014 | Koki et al. | |
| 2014/0207303 A1 | 7/2014 | McGregor et al. | |
| 2016/0141873 A1 | 5/2016 | Ellice-Flint et al. | |
| 2016/1014187 | 5/2016 | Branko et al. | |
| 2017/0018924 A1* | 1/2017 | Wormley | H02J 3/46 |
| 2020/0106269 A1* | 4/2020 | Hannon | H02J 3/14 |

OTHER PUBLICATIONS

International Search Report of Application No. PCT/IL2017/051114 dated Mar. 12, 2018.

* cited by examiner

405 — Determining aggregated power consumption values for each electrical power node, wherein for each electrical power node the aggregated power consumption values are received for all consumers assigned thereto

406 — Comparing aggregated consumer values for consumers corresponding to a first electrical power node to aggregated consumer values for consumers corresponding to a second electrical power node of the at least two electrical power nodes

407 — Allocating resources of the at least one power distributer facility, from the first electrical power node to the second electrical power node if the difference between the compared consumer values exceeds a predetermined threshold

Fig. 4B

Determining aggregated power consumption values for each electrical power node, wherein for each electrical power node the aggregated power consumption values are received for all consumers assigned thereto

405

Comparing aggregated consumer values for consumers corresponding to a first electrical power node to aggregated consumer values for consumers corresponding to a second electrical power node of the at least two electrical power nodes

406

Allocating maintenance resources to a malfunctioning power node according to aggregated consumer value of the power node

SYSTEM AND METHOD FOR MANAGEMENT OF AN ELECTRICITY DISTRIBUTION GRID

CROSS-REFERENCE TO RELATED APPLICATIONS

This application is a National Phase Application of PCT International Application No. PCT/IL2017/051114, International Filing Date: Oct. 2, 2017, claiming the benefit of U.S. Patent Application No. 62/404,789, filed Oct. 6, 2016, which are hereby incorporated by reference.

FIELD OF THE INVENTION

The present invention relates to electricity distribution grids. More particularly, the present invention relates to systems and methods for management of electricity distribution grids.

BACKGROUND OF THE INVENTION

In recent years, power consumption data has become available to providers (e.g. power plants) utilizing "smart" power consumption meters. These power consumption meters are usually directly coupled to a consumer, for instance coupled to a power grid of a private household, such that the power provider may at any time retrieve data from the meters, for instance retrieve power consumption data via a communication network.

In AC circuits, the portion of power averaged over a complete cycle of the AC waveform, results in net transfer of energy in one direction and known as active power (sometimes also called real power). The portion of power due to stored energy, which returns to the source in each cycle, is known as reactive power. Some "smart" power consumption meters are capable of providing both active and reactive power data.

While a vast amount of power consumption data is available, there is still a need for a way to manage all of this data to optimize electricity distribution grids.

SUMMARY OF THE INVENTION

There is thus provided, in accordance with some embodiments of the invention, a method of managing an electricity distribution grid, the method including receiving a layout of at least one electricity distribution grid coupled to at least one power distributor facility, each grid having at least two electrical power nodes, collecting data for at least one consumer of the electricity distribution grid, assigning a dynamic consumer value to each of the at least one consumer according to predefined attributes, assigning each consumer of the at least one consumer to at least one electrical power node, determining aggregated power consumption values for each electrical power node, wherein for each electrical power node the aggregated power consumption values are received for all consumers assigned thereto, comparing aggregated consumer values for consumers corresponding to a first electrical power node to aggregated consumer values for consumers corresponding to a second electrical power node of the at least two electrical power nodes, and allocating resources of the at least one power distributor facility, from the first electrical power node to the second electrical power node, if the difference between the compared consumer values exceeds a predetermined threshold.

In some embodiments, resources of the at least one power distributor facility, may be allocated from a first electricity distribution grid to a second electricity distribution grid. In some embodiments, at least one consumer may be assigned to receive electrical power from a different electrical power node. In some embodiments, the collected data may have information regarding at least one of weather conditions, socio-economic status, power consumption data for the one or more consumers, and average power consumption values for a group of consumers in a predefined geographical area. In some embodiments, the collected data may be received from one or more smart meter associated with at least one consumer.

In some embodiments, assigning each consumer to at least one electrical power node may include associating each consumer to a consumption group, according to one or more attributes of each consumer, wherein at least one of the consumers in each group is connected to a smart meter. In some embodiments, the predefined attributes may include at least one of uniformness of power consumption, records of past power consumption, peak power consumption, and electrical power rates. In some embodiments, consumer values may be ranked based on dissatisfaction values of corresponding power node In some embodiments, the determination of aggregated power consumption may be based on forecasting of power consumption. In some embodiments, the layout of the electricity distribution grid may be planned. In some embodiments, maintenance resources may be allocated to a malfunctioning power node.

There is thus provided, in accordance with some embodiments of the invention, an electricity distribution grid managing system, including at least one electrical power grid coupled to at least one power distributor facility, each grid including at least two electrical power nodes, wherein each electrical power node is configured to provide electrical power to at least one consumer, a first database including consumer values assigned to each consumer, a second database including aggregated power consumption values for each electrical power node, wherein for each electrical power node the aggregated power consumption values are for all consumers assigned thereto, and a processor, operationally coupled to the at least two electrical power nodes, to the first database and to the second database, wherein the processor is configured to allow reallocation of resources of the at least one power distributor facility, to a different electrical power node. In some embodiments, the reallocation may be carried out automatically if a difference between consumer values of the corresponding electrical power nodes exceeds a predetermined threshold.

In some embodiments, the processor may be configured to allow reallocation of resources of the at least one power distributor facility, to a different electricity distribution grid. In some embodiments, the processor may be configured to allow reallocation of at least one consumer to a different electrical power grid. In some embodiments, the first database may have information regarding at least one of weather conditions, power consumption rates as provided to each consumer, and average power consumption values for a group of consumers in a predefined geographical area. In some embodiments, the second database may have information regarding at least one of uniformness of power consumption, records of past power consumption, peak power consumption, and electrical power rates.

In some embodiments, power consumption data from consumers may be received from one or more smart meter associated with the at least one consumer. In some embodiments, communication between the one or more smart meter and the processor may be carried out wirelessly. In some embodiments, at least two electric power nodes may be further connected to at least one parent power node.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4B shows a continuation of the flowchart from FIG. 4A, according to some embodiments of the invention; and FIG. 4C shows a flowchart of a method of managing an electricity distribution grid with resource allocation, according to some embodiments of the invention.

Figure 1:
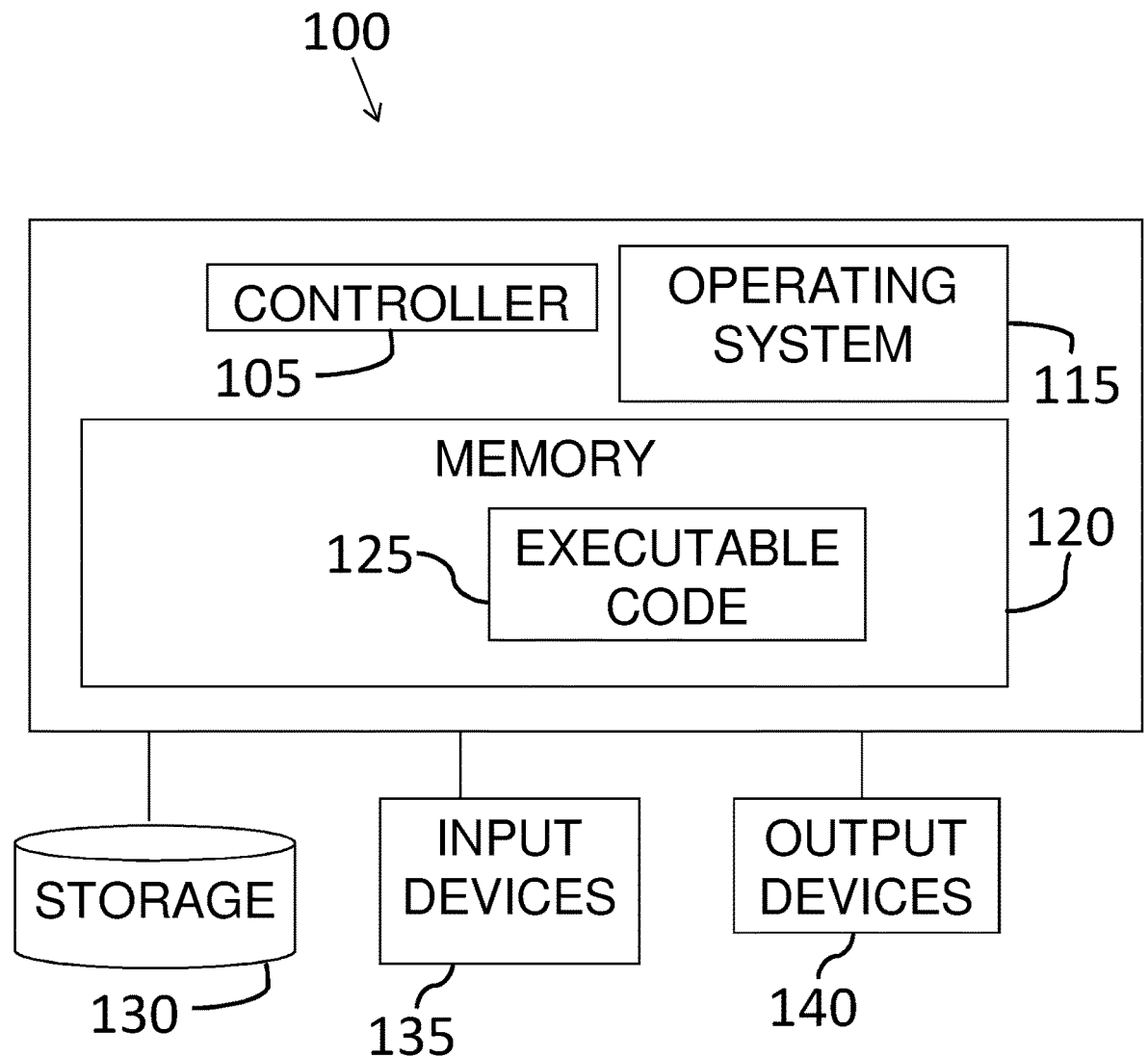
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a block diagram of an exemplary computing device according to embodiments of the present invention. Computing device 100 may include a controller 105 that may be, for example, a central processing unit processor (CPU), a chip or any suitable computing or computational device, an operating system 115, a memory 120, a storage 130, an input devices 135 and an output devices 140.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application for managing power consumption data. Where applicable, executable code 125 may carry out operations described herein in real-time. Computing device 100 and executable code 125 may be configured to update, process and/or act upon information at the same rate the information, or a relevant event, are received. In some embodiments, more than one computing device 100 may be used. For example, a plurality of computing devices that include components similar to those included in computing device 100 may be connected to a network and used as a system. For example, managing power consumption data may be performed in realtime by executable code 125 when executed on one or more computing devices such computing device 100.

Storage 130 may be or may include, for example, a hard disk drive, a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a modem, printer or facsimile machine, a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

Some embodiments may be provided in a computer program product that may include a non-transitory machine-readable medium, with instructions stored thereon, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including optical disks and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multipurpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 2:
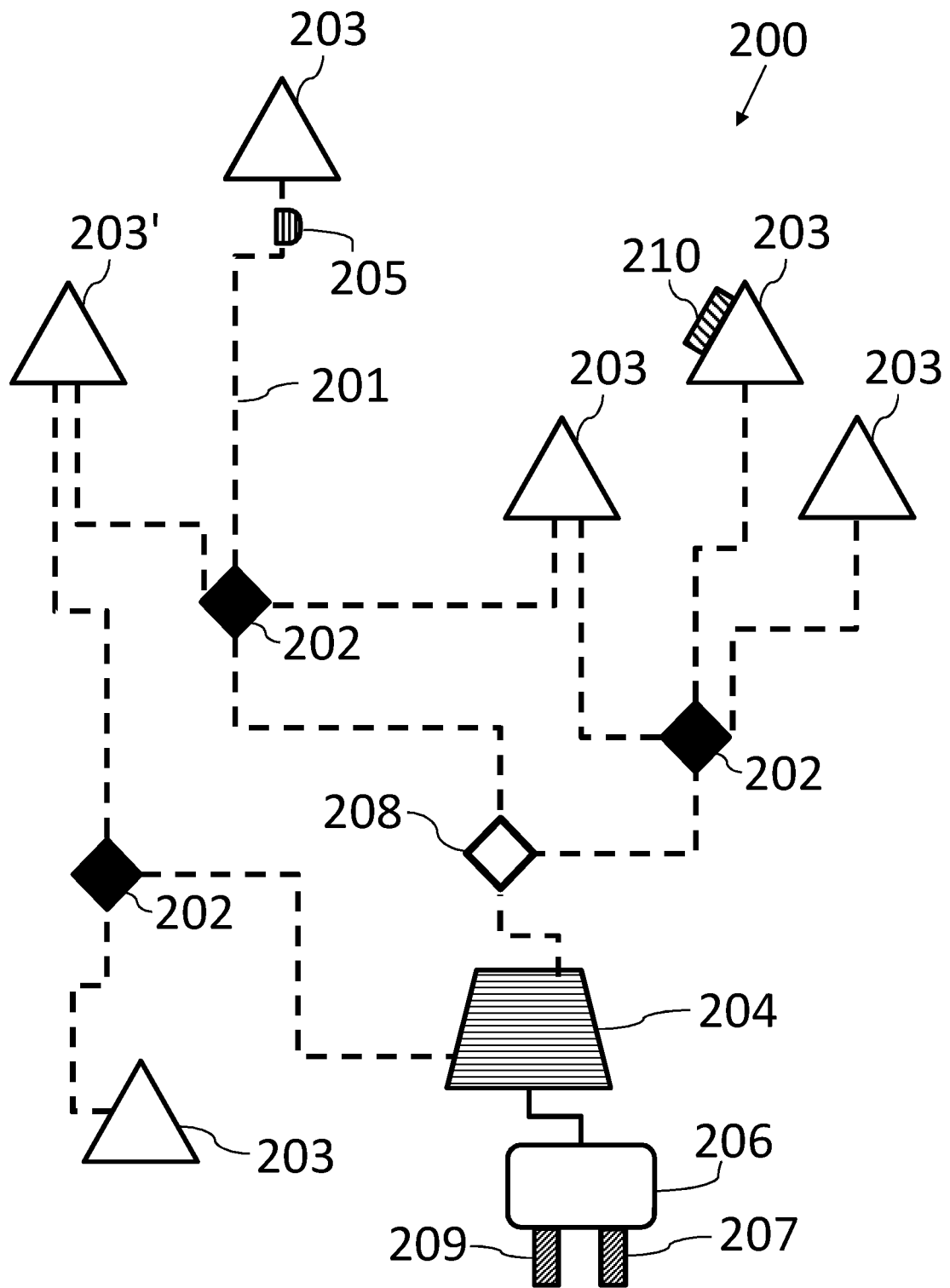
FIG. 2 schematically illustrates an electricity distribution grid management system, according to some embodiments of the invention.

Reference is now made to FIG. 2, which schematically illustrates an electricity distribution grid management system 200, according to some embodiments of the invention. Electricity distribution grid management system 200 may include at least one electrical distribution grid 201 (indicated with a dashed line) with at least two electrical power nodes (or electrical power transformation centers) 202. Each electrical power node 202 may be configured to provide electrical power, via electrical distribution grid 201, to at least one consumer 203 (e.g., a private household or an office building). It should be noted that each electrical power node 202 may have a predetermined power capacity to be provided to consumers. In some embodiments, at least one power distributor facility 204 (e.g., a local power plant) may distribute electrical power, via electrical distribution grid 201, to electrical power nodes 202 and thereby to consumers 203. In some embodiments, distribution of electrical power, via electrical distribution grid 201, with electrical power nodes 202 may correspond to the predetermined power capacity thereof. In some embodiments, at least two power distributors 204 may manage power distribution into the grid 201 in accordance with available power to be consumed by consumers 203. For example, electricity distribution grid management system 200 may manage power distribution from two separate (e.g., competing) power distributors 204.

According to some embodiments, at least one consumer 203 may be equipped with a power production device 210 (e.g., a solar panel), such that power distribution within the electrical distribution grid 201 may be managed in accordance with expected power production (and thereby power consumption) at the respective consumer 203.

According to some embodiments, electrical distribution grid 201 may have (smart) power consumption meters 205, which measure power consumption of at least one consumer 203 that is coupled thereto, so as to allow monitoring of the power consumption of consumers 203. In some embodiments, power consumption meters 205 may also be configured to allow communication with at least one analysis computerized device (or central processor) 206 operably coupled to at least one power distributor 204. In some embodiments, computerized device 206 may be a computing device 100 (such as shown in FIG. 1) with corresponding processing and memory elements configured to allow analyzing and processing of aggregated data from all consumers 203. It should be appreciated that via the coupling to power distributor 204, the analysis computerized device 206 may be operationally coupled to at least two electrical power nodes 202.

It should be appreciated that communication with computerized device 206 may be carried out via a wireless network and/or via communication cables (for instance adjacent to electrical distribution grid 201). In some embodiments, different power consumption meters 205 may communicate with computerized device 206 via different networks, for instance a wired network and a cellular network.

In some embodiments, each consumer 203 may have a user profile indicating typical power consumption of that user. Thus, data received for that consumer 203 (e.g., from consumption meters 205) may be compared to the user profile in order to detect changes. For example, a malfunction in a portion of electrical distribution grid 201 may cause significantly lower power consumption (as well as require grid maintenance), and therefore allocation of resources at corresponding electrical power node(s) 202 may be required. In some embodiments, grid maintenance may correlate to power node 202 congestion forecast as well as the aggregated value of all consumers 203 coupled to that power node 202. It should be noted that grid maintenance may also cause planned and/or unplanned power shutdowns that may also influence resource allocation throughout the electrical power grid 201. For example, an expected load on a particular power node 202 coupled to a large building 203 on a weekend (e.g., on a hot day when multiple air conditioners are expected to operate) may cause electricity distribution grid management system 200 to automatically allocate power resources to a different node 202 coupled to that building 203 (or alternatively call a technician to respond to expected malfunctions) such that failures in the grid may be prevented.

In some embodiments, each consumer 203 may have a dynamic user profile that may be modified (e.g., daily or weekly) based on changes in power consumption (and/or production, e.g. with solar panels) patterns. For example, a consumer 203 for a household of four persons may have different consumption patterns if one of the persons in the household is on vacation for a week.

In some embodiments, at least two electrical power nodes 202 may be further coupled to a parent power node 208 that may be positioned between power nodes 202 and power distributor 204, along electrical distribution grid 201. Therefore, power distribution in electrical distribution grid 201 may also include distribution between parent power nodes 208 and "child" electrical power nodes 202.

According to some embodiments, electricity distribution grid management system 200 may include a first database 207, operably coupled to computerized device 206, the first database 207 including information with consumer values assigned to each consumer 203. In some embodiments, electricity distribution grid management system 200 may further include a second database 209, operably coupled to computerized device 206, the second database 209 including information with aggregated power consumption values for each electrical power node 202 (e.g., how much power consumption is registered in a particular node for all consumers coupled thereto). In some embodiments, the aggregated power consumption value for a particular electrical power node 202 may be the aggregated power consumption values for all consumers 203 coupled thereto, for instance for a particular time period (e.g., day or week).

In some embodiments, first database 207 may have information (influencing the power consumption) regarding at least one of: ambient weather conditions, power consumption rates as provided to each consumer 203, and average power consumption values for a group of consumers 203 in a predefined geographical area. For example, on a cold day more heaters may be turned on and thereby increasing overall power consumption. It should be appreciated that in an area having smart power consumption meters within a predetermined geographical zone, neighboring consumers may present similar power consumption behavior (e.g. for families from similar socio-economic levels), such that these consumers may be grouped based on their power consumption, for instance grouped within a street, a portion of a street, a neighborhood or even within a city.

In some embodiments, first database 207 may also have information with calendar data, for example, where people on national holiday for instance may use more electrical devices compared to weekdays where people are usually at work during the day.

In some embodiments, second database 209 may have information (influencing the power consumption) regarding at least one of: uniformness of power consumption of each consumer, records of past power consumption of each consumer, peak power consumption and minimum power consumption history of each consumer, and electrical power rates paid by each consumer. It should be noted that data from second database 209 may provide an indication for changes in power rates during different hours, compared to actual consumption data, e.g. from power consumption meters 205, in order to indicate power consumption at a time of high power rates.

In some embodiments, for each electrical power node 202 the aggregated power consumption values may be the aggregated consumption values of all consumers 203 assigned thereto. For example, a single electrical power node 202 may be coupled to three consumers 203, each having power consumption meter 205 such that analysis computerized device 206 may receive power consumption information for all three consumers 203 assigned to that electrical power node 202, for example the power consumption information may be stored at second database 209.

It should be noted that each consumer 203 may be coupled to more than one electrical power node 202 via electrical distribution grid 201, for example as shown in FIG. 2 with consumer 203'. According to some embodiments, analysis computerized device 206 may be configured to control automatic reallocation of at least one consumer 203 to a different electrical power node 202 through the electrical distribution grid 201. In some embodiments, the reallocation may be carried out if a difference between aggregated consumer values, for example stored on first database 207, of all consumers corresponding to a first electrical power node 202 and aggregated consumer values for all consumers corresponding to a second electrical power node 202 exceeds a predetermined threshold. In some embodiments, such reallocation may be carried out during planning stage of a new power grid to be built.

It should be appreciated that the stability of electricity distribution grid management system 200 and/or stability of its electrical power nodes 202 operation (e.g., as shown in FIG. 2) may be correlated to various resources assigned thereto. Therefore, management of the stability of electricity distribution grid management system 200 may be achieved with management of resources corresponding to electrical power nodes 202, as further described hereinafter.

Figure 3:
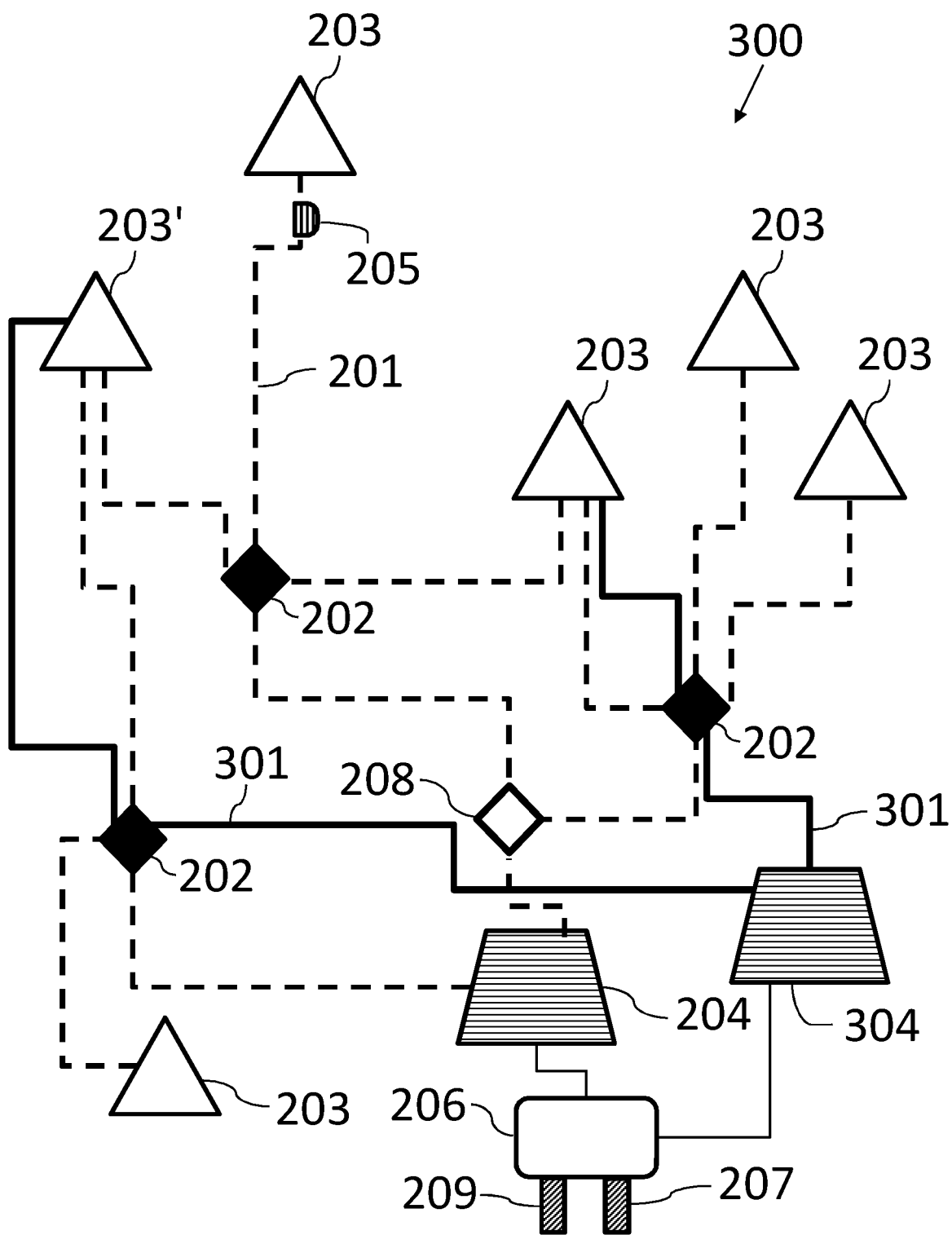
FIG. 3 schematically illustrates an electricity distribution grid management system with two electrical distribution grids, according to some embodiments of the invention.

Reference is now made to FIG. 3, which schematically illustrates an electricity distribution grid management system 300 with two electrical distribution grids, according to some embodiments of the invention. Electricity distribution grid management system 300 may include a first electrical distribution grid 201 (indicated with a dashed line) with at least two electrical power nodes 202, and a second electrical distribution grid 301 (indicated with a solid line) with at least two electrical power nodes 202.

According to some embodiments, a first power distributor 204 (e.g., a local power plant) may distribute electrical power via first electrical distribution grid 201, and/or a second power distributor 304 (e.g., a local power plant) may distribute electrical power via second electrical distribution grid 301 to corresponding electrical power nodes 202 and thereby to consumers 203. In some embodiments, management of power distribution to electrical power nodes 202 may be carried out in accordance with dynamic consumer values for each consumer 203. In some embodiments, management of power production from at least one power distributor may be managed by electricity distribution grid management system 300, for instance based on dynamic values of power consumption and/or production in at least one electrical distribution grid.

In some embodiments, management of power production at electricity distribution grid management system 300 may be carried out by at least one computerized device 206. For example, an administrator (or operator) of power distribution may receive indications of at least one of current power consumption and/or production and forecast of future power consumption and/or production for each consumer 203 to select a power grid to distribute power to a particular power node 202. In some embodiments, electricity distribution grid management system 300 may manage bi-directional power production from power distributor and from consumers (e.g., producing power from renewable energy sources). In another example, an administrator (or operator) of power distribution may select a power grid to distribute power to a particular power node 202 based on power consumption rates for each power grid 201, 301 and/or each power distributor 204, 304. It should be noted that while two power grids are illustrated in FIG. 3, additional power grids may be similarly added to electricity distribution grid management system 300.

Figure 4A:
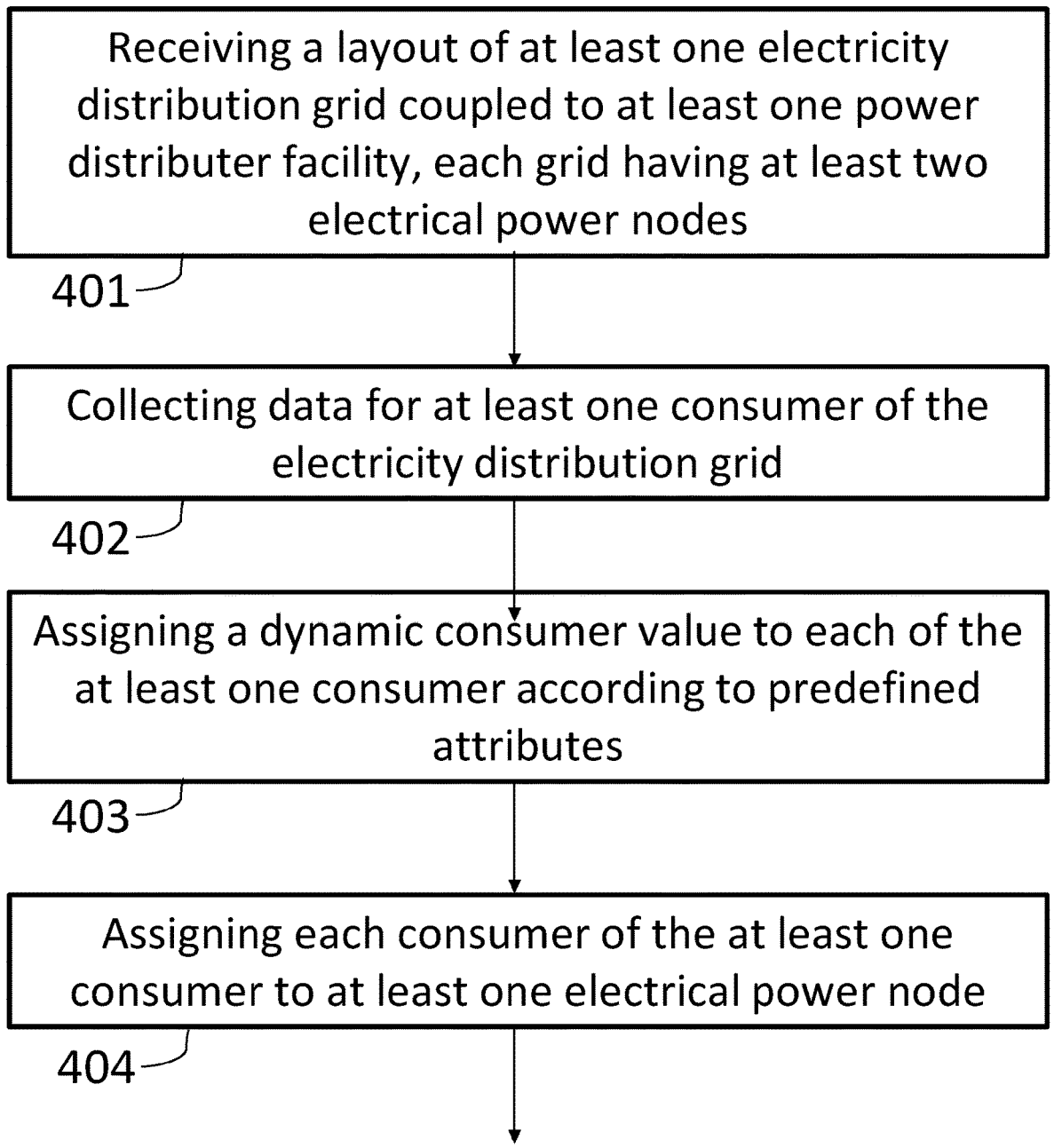
FIG. 4A shows a flowchart of a method of managing an electricity distribution grid, according to some embodiments of the invention.

Reference is now made to FIGS. 4A and 4B, which show a flowchart of a method of managing an electricity distribution grid, according to some embodiments of the invention. In some embodiments, a layout of the at least one electricity distribution grid 201, having at least two electrical power nodes 202, may be received 401 (e.g., by computerized device 206). It should be appreciated that receiving 401 the layout of the at least one electricity distribution grid 201 may be carried out once (e.g., during a system planning stage), for example receiving 401 the layout of the power grid.

According to some embodiments, determination of consumer values (e.g., dynamic values) may be based on forecasting of future required electrical power consumption and/or expected power production, where the forecasting may include calculating expected consumption (short-term and long-term) for each consumer, for instance using disaggregation of previous electrical consumption to calculate expected consumption. Additional factors taken into account for such forecasting may include at least one of astronomical calendar (e.g., providing sunrise and sunset times), prediction and training based on historical recorded electrical consumption, and decision tree algorithms with linear regression (e.g., the "weka.m5p" algorithm).

In some embodiments, data for at least one consumer 203 of the at least one electricity distribution grid 201 may be collected 402 (e.g., by computerized device 206). For example, collecting 402 data may include a combination of the received electric distribution grid layout (or topology) and consumer 203 data, e.g., collecting the data to determine which consumer 203 is coupled to which power node 202 where the determination may be based on consumer parameters such as geographical position and social value (e.g., based on status of consumer such as large industrial consumer or VIP consumer).

In some embodiments, the collected data may have information regarding at least one of weather conditions at a predefined geographical area (e.g. a city), socio-economic status of consumers in the area, power consumption data for the one or more consumers in the area, and average power consumption values for a group of consumers in the predefined geographical area.

In some embodiments, a dynamic consumer value may be assigned 403 (e.g., by computerized device 206) to each of the at least one consumer 203 according to predefined attributes (e.g. predictability, and/or profitability of their historic energy consumption). The consumer values and predefined attributes may be for example stored at first database 207. In some embodiments, each consumer 203 of the at least one consumer 203 may be assigned 404 to at least one electrical power node 202.

It should be noted that such assigning 404 may combine in one node 202 different consumers 203 with time based uniform aggregated power consumption and with similar level of consumption values. Thus, a combined optimization parameter may be defined as a linear combination of these two factors (i.e. uniform aggregated power consumption on time and similar level of consumption values), and in case that several alternatives are possible, assigning nodes 202 based on calculation of the combined optimization parameter.

In some embodiments, the assigning 404 may include associating each consumer 203 to a consumption group, according to one or more attributes of each consumer 203, wherein at least one consumer 203 in each group may be connected to a smart meter.

In some embodiments, aggregated power consumption values may be determined 405 (e.g., by computerized device 206) for each electrical power node 202, wherein for each electrical power node 202 the aggregated power consumption values may be received for all consumers 203 assigned thereto. The aggregated power consumption values may be for example stored at second database 209.

In some embodiments, aggregated consumer values corresponding to a first electrical power node 202 may be compared 406 (e.g., by computerized device 206) to aggregated consumer values for consumers 203 corresponding to a second electrical power node 202.

In some embodiments, resources of the at least one power distributor facility 204 may be allocated 407 (e.g., by computerized device 206) from the first electrical power node to the second electrical power node if the difference between the compared consumer values exceeds a predetermined threshold (e.g., difference exceeding ten percent). For example, two consumers 203, consuming power at the same time of day, require twice more node 202 capacity, compared to two consumers, consuming power at different times of day.

Reference is now made to FIG. 4C, which shows a flowchart of a method of managing an electricity distribution grid with resource allocation, according to some embodiments of the invention. Maintenance resources may be allocated 408 (e.g., by computerized device 206) to a malfunctioning power node 202, for instance according to aggregated consumer value of the power node 202. In some embodiments, allocating 408 maintenance resources may be performed instead of assigning 407 at least one consumer 203 to receive electrical power from a different electrical power node 202.

In some embodiments, consumer values (e.g., dynamic values) may be ranked based on dissatisfaction values, for example due to past critical events such as power shutdowns. It should be appreciated that since consumer values may affect resource allocation in the grid, dissatisfaction values may therefore also correspond to reallocation of resources. In some embodiments, consumer values (e.g., dynamic values) may be affected by at least one of predictability of power consumption (e.g., uniformness of consumption at specific hours), consumption during off-peak time, and social values (e.g., hospitals or military facilities that require constant power or particular profitable consumers). In some embodiments, the consumer values (e.g., dynamic values), for consumers 203 that produce power from renewable energy sources, may be ranked based on locality of the power production, for example a consumer 203 that produces power during a time period when the respective power grid 201, 301 is in relative shortage of power may receive a higher rank for the consumer value.

According to some embodiments, power production for instance with renewable energy sources (e.g. with solar panels) may also be taken into account during the analysis. Such analysis may be carried out with additional parameters for ambient conditions (e.g. wind velocity for wind power, presence of clouds for solar power, etc.) in the proximity of the consumers or providers of energy to the power grid. In some embodiments, it may be possible to detect which users produce power by correlating historical data on consumed energy from the electrical grid, by reducing the produced energy from the total consumed energy (for instance dependent on sky brightness and sunset/sunrise times in the case of solar panels). In some embodiments, historic power production may be evaluated, and thereby provide for an individual user a forecast, taking into account private power production in order to evaluate the expected consumption from the electricity grid.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A method of managing an electricity distribution grid, the method comprising:
   receiving a layout of at least one electricity distribution grid coupled to at least one power distributer facility, each grid having at least two electrical power nodes;
   collecting data for at least one consumer of the electricity distribution grid;
   assigning a dynamic consumer value to each of the at least one consumer according to predefined attributes;
   assigning each consumer of the at least one consumer to at least one electrical power node;
   determining aggregated power consumption values for each electrical power node, wherein for each electrical power node the aggregated power consumption values are received for all consumers assigned thereto;
   comparing aggregated consumer values for consumers corresponding to a first electrical power node to aggregated consumer values for consumers corresponding to a second electrical power node of the at least two electrical power nodes; and
   allocating resources of the at least one power distributer facility, from the first electrical power node to the second electrical power node, if the difference between the compared consumer values exceeds a predetermined threshold.

2. The method of claim 1, further comprising allocating resources of the at least one power distributer facility, from a first electricity distribution grid to a second electricity distribution grid.

3. The method of claim 1, further comprising assigning at least one consumer to receive electrical power from a different electrical power node.

4. The method of claim 1, wherein the collected data has information regarding at least one of weather conditions, socio-economic status, power consumption data for the one or more consumers, and average power consumption values for a group of consumers in a predefined geographical area.

5. The method of claim 1, wherein the collected data is received from one or more smart meter associated with at least one consumer.

6. The method of claim 1, wherein assigning each consumer to at least one electrical power node comprises:
   associating each consumer to a consumption group, according to one or more attributes of each consumer; wherein at least one of the consumers in each group is connected to a smart meter.

7. The method of claim 1, wherein the predefined attributes comprise at least one of uniformness of power consumption, records of past power consumption, peak power consumption, and electrical power rates.

8. The method of claim 1, further comprising ranking consumer values based on dissatisfaction values of corresponding power nodes.

9. The method of claim 1, wherein the determination of aggregated power consumption is based on forecasting of power consumption.

10. The method of claim 1, further comprising planning the layout of the electricity distribution grid.

11. The method of claim 1, further comprising allocating maintenance resources to a malfunctioning power node.

12. An electricity distribution grid managing system, comprising:
   at least one electrical power grid coupled to at least one power distributer facility, each grid comprising at least two electrical power nodes, wherein each electrical power node is configured to provide electrical power to at least one consumer;
   a first database comprising consumer values assigned to each consumer;
   a second database comprising aggregated power consumption values for each electrical power node, wherein for each electrical power node the aggregated power consumption values are for all consumers assigned thereto; and
   a processor, operationally coupled to the at least two electrical power nodes, to the first database and to the second database, wherein the processor is configured to allow reallocation of resources of the at least one power distributer facility, to a different electrical power node, wherein the reallocation is carried out automatically if a difference between consumer values of the corresponding electrical power nodes exceeds a predetermined threshold.

13. The system of claim 12, wherein the processor is configured to allow reallocation of resources of the at least one power distributer facility, to a different electricity distribution grid.

14. The system of claim 12, wherein the processor is configured to allow reallocation of at least one consumer to a different electrical power grid.

15. The system of claim 12, wherein the first database has information regarding at least one of weather conditions, power consumption rates as provided to each consumer, and average power consumption values for a group of consumers in a predefined geographical area.

16. The system of claim 12, wherein the second database has information regarding at least one of uniformness of power consumption, records of past power consumption, peak power consumption, and electrical power rates.

17. The system of claim 12, wherein power consumption data from consumers is received from one or more smart meter associated with the at least one consumer.

18. The system of claim 17, wherein communication between the one or more smart meter and the processor is carried out wirelessly.

19. The system of claim 12, wherein at least two electric power nodes are further connected to at least one parent power node.

* * * * *